March 10, 1925.  
J. BUCHLI  
1,529,163  
COMBINED STEAM AND INTERNAL COMBUSTION LOCOMOTIVE  
Filed April 17, 1924
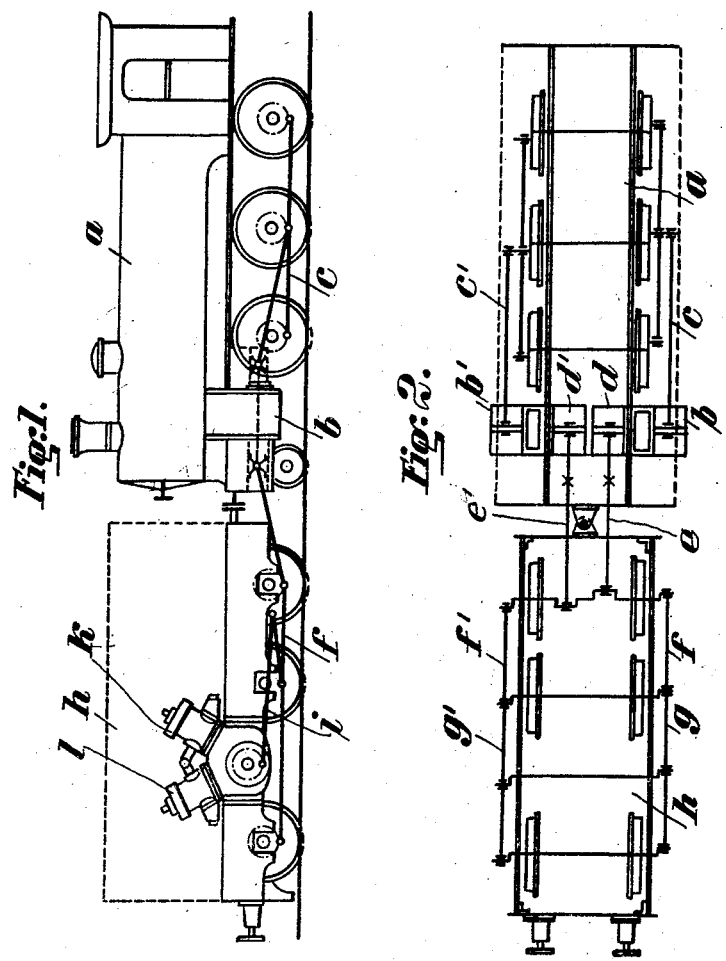

Patented Mar. 10, 1925.

1,529,163

UNITED STATES PATENT OFFICE.

JACOB BUCHLI, OF BADEN, SWITZERLAND.

COMBINED STEAM AND INTERNAL-COMBUSTION LOCOMOTIVE.

Application filed April 17, 1924. Serial No. 707,222.

*To all whom it may concern:*

Be it known that I, JACOB BUCHLI, a citizen of Switzerland, residing at Baden, Switzerland, have invented certain new and useful Improvements in Combined Steam and Internal-Combustion Locomotives, of which the following is a specification.

It has already been proposed to build locomotives with various types of drive, as for example combined steam and internal-combustion locomotives, in such a way that the internal-combustion engine and the steam engine each work through separate driving gear on separate parts of the vehicle. The operation of such combined steam and internal-combustion locomotives has proved to possess draw-backs as soon as only one type of driving engine is in operation, as the second driving engine must in this case be drawn along by the first without the possibility of the adhesive weight being utilized.

The object of the present invention is to get rid of this drawback and make the working of such a type of locomotive with separate driving gear on separate vehicles more advantageous, so that for every condition of working, i. e. when starting and also when running, the total weight of the locomotive is available for adhesion. According to the invention this is attained by the driving axles of the part carrying the internal-combustion engine being connected not only with the internal-combustion engine, but also by means of jointed connecting rods with the steam engine, so that the whole weight of both parts of the vehicle is available as adhesion both for starting with the steam engine alone and also for running with the internal-combustion engine and the steam engine.

An example of this construction in the form of a locomotive consisting of two separate vehicles is shown in the accompanying drawing.

Fig. 1 is a side elevation,

Fig. 2 a plan of a locomotive of this type.

The locomotive is composed of two separate vehicles $a$ and $h$. The part $a$ is driven, through connecting rods $c$ and $c'$ by two steam cylinders $b$ and $b'$ fitted outside the frame of the vehicle. Two steam cylinders $d$ and $d'$ lying within the frame of the vehicle work through jointed connecting rods $e$ and $e'$ on the driving wheels of the second part $h$ of the vehicle which are connected by coupling rods $f$, $f'$ and $g$, $g'$. These driving wheels are, however, also driven through connecting rods $i$ by the cylinders $k$ and $l$ of an internal-combustion engine arranged on the second part $h$ of the vehicle.

If, when starting such a locomotive, the steam engine arranged on the first part $a$ of the vehicle is set to work, not only the adhesive weight of the part $a$ of the vehicle is available for starting but also the adhesive weight of the part $h$ in consequence of the driving axles of the part $h$ being driven by the steam engine. When the vehicle is running, the adhesive weight of both parts is similarly utilized.

I claim:

A combined steam and internal-combustion locomotive consisting of two vehicles coupled to each other, one of which carries a steam engine and the other an internal-combustion engine, the driving axles of the internal-combustion engine being connected not only with the internal-combustion engine but also with the steam engine through jointed connecting rods for the purpose of utilizing the total adhesive weight of the combined locomotive when starting as well as when running.

In testimony whereof I have affixed my signature in presence of two witnesses.

JACOB BUCHLI.

Witnesses:
L. SUTER,
AUG. BRÜGG.